United States Patent [19]

Iida et al.

[11] Patent Number: 5,000,983

[45] Date of Patent: Mar. 19, 1991

[54] PROCESS FOR THE PREPARATION OF MAGNETIC RECORDING MEDIUM

[75] Inventors: Shinobu Iida; Masaaki Fujiyama; Keisuke Yamada; Hiroshi Kato; Naoki Sakai, all of Odawara, Japan

[73] Assignee: Fuji Photo Film Co., Ltd., Kanagawa, Japan

[21] Appl. No.: 285,392

[22] Filed: Dec. 16, 1988

Related U.S. Application Data

[63] Continuation of Ser. No. 7,216, Jan. 27, 1987, abandoned.

[30] Foreign Application Priority Data

Jan. 24, 1986 [JP] Japan .................................. 61-13184

[51] Int. Cl.$^5$ ............................................. B05D 5/12
[52] U.S. Cl. ................................... 427/130; 427/172; 428/694; 428/900
[58] Field of Search ................ 427/130, 172; 428/694, 428/900

[56] References Cited

U.S. PATENT DOCUMENTS 4,557,947 12/1985 Deimling et al. ................... 427/130

FOREIGN PATENT DOCUMENTS 1397817 10/1972 United Kingdom .

*Primary Examiner*—Bernard Pianalto
*Attorney, Agent, or Firm*—Sughrue, Mion, Zinn, Macpeak & Seas

[57] ABSTRACT

A process for the preparation of a magnetic recording medium which comprises the steps of subjecting a magnetic recording layer coated on a nonmagnetic support to surface smoothening treatment, said magnetic recording layer comprising a ferromagnetic powder dispersed in a binder which is composed of a resin component and a curing agent, and then shaving a surface of said magnetic recording layer by means of a shaving device having high hardness.

4 Claims, No Drawings

PROCESS FOR THE PREPARATION OF MAGNETIC RECORDING MEDIUM

This is a Continuation of application Ser. No. 07/007,216, filed Jan. 27, 1987.

BACKGROUND OF THE INVENTION

1. Field of the invention

The present invention relates to a process for the preparation of a magnetic recording medium comprising a nonmagnetic support and a magnetic recording layer provided on the support.

2. Description of prior arts

A magnetic recording medium comprising a nonmagnetic support and a magnetic recording layer provided thereon is used as an audio tape, a video tape, or a recording medium for a computer system. The magnetic recording layer comprises a binder and a ferromagnetic powder dispersed therein.

The magnetic recording medium is generally prepared by the following process. A binder component containing a resin component and a curing agent and a ferromagnetic powder are dispersed in a solvent to prepare a magnetic paint. The magnetic paint is coated over a nonmagnetic support to form a layer of the magnetic paint on the non-magnetic support. The coated layer of the magnetic paint is then subjected to various treatments such as magnetic orientation, drying treatment and surface smoothening treatment, and then subjected to curing treatment to cure the curing agent contained in the coated layer. Subsequently, the sheet having been subjected to such treatment steps is cut or slit into a desired shape to prepare a magnetic recording medium.

Recently, a demand for a higher density recording system has increased, and hence Co-containing $\gamma$-$Fe_2O_3$ or a ferromagnetic metal powder has been employed in place of a conventional iron oxide-type ferromagnetic powder such as $\gamma$-$Fe_2O_3$.

However, the magnetic recording layer containing the above-mentioned Co-containing $\gamma$-$Fe_2O_3$ or ferromagnetic metal powder is liable to decrease in the running endurance, although the electromagnetic conversion characteristics increase, as compared with the magnetic recording layer containing the iron oxide-type ferromagnetic powder, because the Co-containing $\gamma$-$Fe_2O_3$ or ferromagnetic metal powder has lower hardness than the iron oxide-type ferromagnetic powder.

For increasing physical strength of the magnetic recording layer of the magnetic recording medium, there has been widely employed, for instance, a combination of a vinyl chloride copolymer having high hardness and a polyurethane resin having low hardness as a resin component. Further, a polyisocyanate compound has been employed as a curing agent in combination with the resin component. In the case of using a ferromagnetic powder having low hardness such as a ferromagnetic metal powder, the amount of the polyurethane resin is increased to impart flexibility to the magnetic recording layer, and further a larger amount of polyisocyanate compound is employed for coping with excessive softening of the magnetic recording layer caused by the employment of the polyurethane resin.

The employment of a large amount of the polyurethane resin is followed by increase of the amount of polyisocyanate compound, and recently a binder containing larger amount of the polyisocyanate compound than that of the polyurethane resin has been generally employed.

The polyisocyanate compound serves to form a three-dimensionally crosslinked structure in the reaction with the resin component in the above-mentioned curing process. However, the whole amount of the employed polyisocyanate compound does not react with the resin component through the curing process, and only approx. 50 wt. % (advantageously approx. 80 wt. %) of the whole amount thereof reacts. The residual portion still remains in the magnetic recording layer in the unreacted state, and gradually reacts with lapse of time. According to study of the present inventors, in a magnetic recording medium using a large amount of the polyisocyanate compound, the unreacted polyisocyanate compound still remains on the surface of the magnetic recording layer in a relatively large amount, and hence the unreacted polyisocyanate compound causes deposit of stains (or dust) on the surface of the magnetic recording layer. It has been further confirmed that the unreacted polyisocyanate compound easily adheres to a magnetic head to cause a clogging on the head.

SUMMARY OF THE INVENTION

It is an object of the present invention to provide a novel process for the preparation of a magnetic recording medium improved in running endurance.

There is provided by the present invention a process for preparing a magnetic recording medium which comprises the steps of subjecting a magnetic recording layer coated on a nonmagnetic support to surface smoothening treatment, said magnetic recording layer comprising a ferromagnetic powder dispersed in a binder which is composed of a resin component and a curing agent, and then shaving a surface of said magnetic recording layer by means of a shaving device having high hardness.

According to the process for the preparation of a magnetic recording medium according to the present invention, the amount of unreacted curing agent present on the surface of the magnetic recording layer of the magnetic recording medium is reduced, whereby the magnetic recording layer of the resulting medium is less deposited with dust, etc. Hence, there can be obtained a magnetic recording medium hardly suffering occurrence of drop-out caused by the deposit of dust. Further, since the magnetic head is hardly stained with the unreacted curing agent, there can be obtained a magnetic recording medium producing less clogging on the head which is caused by the curing reaction of the unreacted curing agent on the head or caused by the deposit of dust on the head.

Furthermore, particles of the ferromagnetic powder and abrasive easily separating (i.e., dropping off) from the surface of the magnetic recording layer are prominently reduced, so that a magnetic recording medium bringing about less clogging on a magnetic head caused by the separated particles in the course of running procedure can be prepared.

In addition to the above-mentioned favorable features, the magnetic recording medium prepared by the invention does not decrease in reproduction output even after repeated running of the medium; that is, the medium shows only a small difference of the reproduction output between the initial running and after the repeated running, because the ferromagnetic powder particles easily dropping off from the surface of the magnetic recording layer are reduced, and the amount of the ferromagnetic powder in the magnetic recording layer hardly decreases even after the repeated running of the medium.

DETAILED DESCRIPTION OF THE INVENTION

In performing the process for the preparation of a magnetic recording medium of the present invention, a magnetic paint is first coated over a nonmagnetic support to form a magnetic recording layer. The magnetic recording layer comprises a binder and a ferromagnetic powder dispersed therein, and the binder comprises a resin component and a curing agent.

The provision of the magnetic recording layer on the nonmagnetic support can be done according to a conventional manner.

For instance, a resin component, a ferromagnetic powder and a curing agent are kneaded and dispersed in a solvent to prepare a magnetic paint, and the magnetic paint is coated over the nonmagnetic support to form a magnetic recording layer on the support.

The resin component employable for the preparation of the magnetic paint can be selected from those conventionally employed. Examples of the resin component include vinyl chloride copolymers (e.g., vinyl chloride/vinyl acetate copolymer, vinyl chloride/vinyl acetate/vinyl alcohol copolymer, vinyl chloride/vinyl acetate/maleic anhydride copolymer, vinyl chloride/vinyl acetate/acrylic acid copolymer, vinylidene chloride/vinyl chloride copolymer, vinyl chloride/acrylonitrile copolymer, ethylene/vinyl acetate copolymer, and vinyl chloride copolymer incorporated with a polar group such as —$SO_3Na$ or —$SO_2Na$ and an epoxy group), cellulose derivatives such as nitrocellulose, acrylic resin, polyvinyl acetal resin, polyvinyl butyral resin, epoxy resin, phenoxy resin, and polyurethane resin (e.g., polyester polyurethane resin, polyurethane resin incorporated with a polar group such as —$SO_3Na$ or —$SO_2Na$, and polycarbonate polyurethane resin).

As the curing agent, a polyisocyanate compound is generally employed.

The polyisocyanate compound employable in the invention can be selected from those generally employed as a curing agent such as a polyurethane resin.

Examples of the polyisocyanate compound include a reaction product of 3 moles of tolylene diisocyanate and 1 mole of trimethylolpropane (e.g., Desmodule L-75 available from Bayer AG), a reaction product of 3 moles of diisocyanate (e.g., xylylene diisocyanate or hexamethylene diisocyanate) and 1 mole of trimethylolpropane, a buret adduct compound of 3 moles of hexamethylene diisocyanate, an isocyanurate compound of 5 moles of tolylene diisocyanate, an isocyanurate adduct compound of 3 moles of tolylene diisocyanate and 2 moles of hexamethylene diisocyanate, isophorone diisocyanate, and a polymer of diphenylmethane diisocyanate.

If the curing treatment is carried out by means of irradiation with electron rays, there can be employed a compound having two or more reactive double bonding such as vinyl chloride copolymer acrylate and urethane acrylate as the curing agent.

In the invention, it is preferred to employ a resin having high hardness such as a vinyl chloride copolymer in combination with a resin having low hardness such as a polyurethane resin. In the case of using the combination of a resin having high hardness such as a vinyl chloride copolymer and a resin having low hardness such as a polyurethane resin as the resin component, the ratio between the former and the latter is generally in the range of from 9:1 to 5:5, preferably in the range of from 9:1 to 6:4, by weight.

The ratio between the above-mentioned resin component and the curing agent is generally in the range of from 9:1 to 5:5 (resin component : curing agent), preferably in the range of from 9:1 to 6:4, by weight.

In the case of using a ferromagnetic powder having low hardness, a larger amount of binder is generally employed than the case of using a ferromagnetic powder having high hardness such as $\gamma$-$Fe_2O_3$. In this case, the amount of the flexible resin such as a polyurethane resin is generally increased.

If the amount of the polyurethane resin is increased as described above, the binder is apt to soften, so that the curing agent such as a polyisocyanate compound is generally used in a large amount to cure the binder.

In the case of using a polyurethane resin as the resin component and a polyisocyanate compound as the curing agent, the ratio between the former and the latter is preferably in the range of from 1:0.8 to 1:2, more preferably in the range of from 1:1 to 1:5, by weight. By setting to the above-mentioned ratio in this range, the resulting magnetic recording layer can show high physical strength and high running endurance even in the case of using a ferromagnetic powder having low hardness.

The total amount of the resin component and the curing agent is generally in the range of 10–100 parts by weight, preferably 15–40 parts by weight, based on 100 parts by weight of the ferromagnetic powder employed.

As a ferromagnetic powder employable in the invention, there can be mentioned a metal oxide-type ferromagnetic powder such as $\gamma$-$Fe_2O_3$, a modified metal oxide-type ferromagnetic powder such as $\gamma$-$Fe_2O_3$ containing other component such as cobalt, and a ferromagnetic metal powder containing a ferromagnetic metal such as iron, cobalt or nickel.

It is advantageous to apply the process of the present invention to the preparation of a magnetic recording medium comprising Co-containing $\gamma$-$Fe_2O_3$ or a ferromagnetic metal powder. Because the deposited component or dust on a magnetic recording layer or a magnetic head can be reduced in spite of using a large amount of curing agent, and accordingly the resulting magnetic recording medium less produces drop-out phenomenon and hardly brings about clogging on the head.

The ferromagnetic metal powder employable in the invention is one containing iron, cobalt or nickel, and having a specific surface area (S-BET) of not less than 42 $m^2/g$, preferably not less than 45 $m^2/g$.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide.

As the modified iron oxide-type ferromagnetic powder such as Co-containing $\gamma$-$Fe_2O_3$ preferably employed in the invention is one having Hc of not less than 300 Oe and S-BET of not less than 25 m²/g.

Processes for the preparation of the above-mentioned ferromagnetic powders are already known, and the ferromagnetic powder employed in the invention can be prepared by the known processes.

There is no specific limitation with resepct to the shape of the ferromagnetic powder employable in the present invention, but generally used is a ferromagnetic powder in a needle shape, a grain shape, a dice shape, a rice shape or a plate shape. Preferably employed is a ferromagnetic powder in a needle shape.

The above-mentioned resin component, polyisocyanate compound and ferromagnetic powder are kneaded and dispersed in a solvent conventionally used in the preparation of a magnetic paint (e.g., methyl ethyl ketone, dioxane, cyclohexanone or ethyl acetate) to prepare a magnetic paint. Kneading and dispersing those components can be carried out according to the conventional manner.

The magnetic paint may contain other known additives such as an abrasive, an antistatic agent, a lubricant and a dispersing agent, or a filler in addition to the above-mentioned components.

Subsequently, the magnetic paint prepared as above is coated over a nonmagnetic support. The coating of the magnetic paint over the support can be done by a known method such as a method of using a reverse roll. The magnetic paint is coated in such a manner that the magnetic recording layer of the resulting recording medium would have thickness of 0.5–10 μm.

As a material of the nonmagnetic support, there can be mentioned those conventionally employed.

The thickness of the nonmagnetic support is generally in the range of 3 to 50 μm, preferably in the range of 5 to 30 μm.

In the process for the preparation of a magnetic recording medium according to the invention, the nonmagnetic support may have a back layer (i.e., backing layer) on the opposite side of the side where a layer of the magnetic paint is to be coated. Further, the nonmagnetic support may be provided with an adhesive layer on the side where a layer of the magnetic paint is to be coated.

The coated magnetic paint layer is generally subjected to treatment of orienting the ferromagnetic powder contained in the magnetic paint-coated layer, that is, a magnetic orientation, and then subjected to a drying process.

After the drying process is done, the coated magnetic paint layer is preferably subjected to a surface smoothening process. The smoothening process is carried out, for example, by using a supercalender roll. Through the surface smoothening process, voids having been produced in the magnetic paint-coated layer by removing the solvent in the drying process are filled with the ferromagnetic powder to increase a filling ratio of the ferromagnetic powder in the magnetic paint-coated layer, whereby a magnetic recording medium having high electromagnetic conversion characteristics can be obtained.

The surface of the magnetic recording layer having been subjected to the surface smoothening process is shaved (or ground) by means of a shaving device having high hardness. At this stage, not smaller than 90 wt. % of the employed curing agent is contained in the magnetic recording layer in the unreacted state, so that the magnetic recording layer is preferably subjected to the following curing treatment to cause the curing agent to react in an amount of not smaller than 50 wt. %, preferably not smaller than 80 wt. %, of the whole amount, and then subjected to the shaving process.

As the curing treatment, there are two treatments of heat curing treatment and curing treatment by means of irradiation with electron rays.(namely, an electron rays exposure-curing treatment). In the invention, any of those treatments can be utilized.

Through the curing treatment, the unreacted curing agent such as a polyisocyanate compound contained in the magnetic recording layer having been subjected to the surface smoothening process reacts with a resin component such as vinyl chloride copolymer and polyurethane resin to form a three dimensionally-crosslinked structure.

Processes for the heat curing treatment are already known, and the known processes can be applied to the present invention.

For instance, the heating curing treatment is generally carried out under the conditions of a temperature of not lower than 40° C. (preferably in the range of 50° to 80° C.) and a period of not shorter than 20 hours (preferably from 24 hours to 7 days).

Processes for the electron rays exposure-curing treatment are already known, and the known processes can be employed in the present invention.

By the above-mentioned curing treatment, not smaller than 50 wt. % of the employed curing agent reacts with the resin component to form a three dimensionally-crosslinked structure, but the residual portion of the curing agent still remains in the magnetic recording layer in the unreacted state.

The laminated sheet comprising the nonmagnetic support and the magnetic recording layer having been subjected the curing process is then slit or cut to have a desired shape.

The procedure for slitting or cutting the sheet is generally done by a conventional method using a conventional cutting machine such as a slitter.

The laminated sheet is then shaven (or ground) on the surface of the magnetic recording layer by means of a shaving device having high hardness.

A shaving device preferably employed in the invention is in the form of wheel or blade. As a material of the shaving device having high hardness, preferably used is sapphire or diamond.

A diamond wheel or a sapphire blade is preferably employed in the invention as the shaving device.

The diamond wheel means herein a rotating grinding device in the form of cylinder having a sintered diamond on its outer surface. The surface of the diamond wheel generally has grits of from #1,200 to #5,000. When the grits is of less than #1,200, the surface of the magnetic recording layer is liable to be damaged by the grining wheel. When the grits have such a large size as exceeding #5,000, the shaving treatment sometimes fails to give the desired effect.

In the case of using the diamond wheel, the shaving process is generally done by setting the rotation times of the diamond wheel and a contact angle of the wheel and the magnetic recording layer to 300–6,000 rpm and 30°–120°, respectively, and running the laminated sheet at a speed of 60–1,200 m/min., providing such a tension of 30–100 g/8 mm to the sheet in the longitudinal direction of the sheet in such a manner that the diamond wheel is brought into contact with the surface of the magnetic recording layer.

The diamond wheel is preferably rotated in the opposite direction to the running direction of the laminated sheet, whereby the shaving can be performed efficiently.

The sapphire blade is a blade made of sapphire on its contacting part (i.e., edge) with the magnetic recording layer.

In the case of using the sapphire blade, the shaving process is generally done by setting a contact angle of the rake face of the blade and the magnetic recording layer to 80°–120°, and running the laminated sheet at a speed of 60–1,200 m/min., providing a tension of 30–100 g/8 mm to the sheet in the longitudinal direction of the sheet in such a manner that the sapphire blade is brought into contact with the surface of the magnetic recording layer.

The magnetic recording layer is brought into contact with the diamond wheel or the sapphire blade at least once. It is particularly advantageous that 2–5 diamond wheels or sapphire blades are successively brought into contact with the surface of the magnetic recording layer, because such process provides a magnetic recording medium that is improved in the running endurance. Further, the successive contact can be done by using a combination of the diamond wheel and the sapphire blade to perform the shaving process.

By the above-mentioned shaving process, unreacted curing agent on the surface of the magnetic recording layer, particles of the ferromagnetic powder or abrasive protruded from the surface of the recording layer, and further a deposit (e.g., dust deposited onto the surface magnetic recording medium) are shaven away from the surface of the recording layer with the binder present in the vicinity of the surface of the recording layer (generally 0.01–5 μm depth from the surface), whereby the surface of the magnetic recording layer is smoothened.

The shaving effect given by bringing the diamond wheel in contact with the magnetic recording layer once is almost the same as that given in the case of using four sapphire blades, and hence a diamond wheel is most preferably employed for the shaving of the surface of the magnetic recording layer in the present invention.

A method comprising subjecting the laminated sheet to surface smoothening treatment, cutting the sheet, and shaving the surface of the magnetic recording layer by brining a sapphire blade or a diamond wheel into contact with the recording layer, in this order, is described above, but this order is given by no means to restrict the invention. For instance, a method comprising a step for cutting or slitting and a step for contacting (shaving) performed at the same place, or a method comprising a step for shaving arranged prior to the cutting or slitting process can be also utilized.

Further, even when the aforementioned curing treatment is not done, the curing reaction of the curing agent with the resin component advances, though its rate is very low, so that the cutting process and the shaving process can be carried out after the surface smoothening process without performing the curing treatment.

The examples and the comparison examples of the present invention are given below. In the following examples, the expression "part(s)" means "part(s) by weight", unless otherwise specified.

EXAMPLE 1

The components for a magnetic paint indicated below were kneaded in a ball mill to give a magnetic paint.

| | |
|---|---|
| Ferromagnetic metal alloy powder (Fe—Ni alloy, Fe: 96 wt. %, Ni: 4 wt. %, specific surface area: 45 m$^2$/g, | 100 parts |
| Vinyl chloride/vinyl acetate/maleic anhydride copolymer (400x100A, available from Nippon Geon Co., Ltd., Japan) | 14 parts |
| Polyurethane resin (Niporan N-2304, available from Nippon Polyurethane Co., Ltd., Japan) | 12 parts |
| Polyisocyanate compound (Desmodule L-75, available from Bayer AG) | 12 parts |
| α-Alumina | 10 parts |
| Stearic acid | 5 parts |
| Butyl stearate | 5 parts |
| Carbon black | 1 part |
| Methyl ethyl ketone | 325 parts |

The obtained magnetic paint was adjusted on its viscosity, and then the magnetic paint was coated over a polyethylene terephthalate support (thickness: 10 μm) by means of a reverse roll in such a manner that the coated layer of the magnetic paint would have thickness of 3.0 μm (after dryness).

The nonmagnetic support having the coated layer of the magnetic paint thereon was treated with an electromagnet at 3,000 gauss under wet condition to give magnetic orientation. After the coated layer was dried, the dried layer was subjected to supercalendering to give a laminated sheet comprising a nonmagnetic support and a magnetic recording layer.

The laminated sheet was heated at 60° C. for 24 hours to cure the polyisocyanate compound contained in the magnetic recording layer, and the heated sheet was then slit into a width of 8 mm. Subsequently, the slit sheet was subjected to the following shaving treatment using a diamond wheel (hereinafter also referred to as "diamond wheel treatment"), to prepare an 8 mm type video tape.

A diamond wheel (diameter: 25 mm, width: 25.6 mm, grita: #2,000, available from Orient Diamond Co., Ltd.) provided with sintered diamonds in the thickness of 1.5 mm around the surface of a core material made of iron was rotated at 2,000 r.p.m. in the opposite direction to the running direction of the magnetic recording layer, and brought into contact with the obtained video tape at a speed of 420 m/min. with a contact angle of the wheel and the tape of 80°, providing tension of 50 g/8 mm to the tape, to shave the surface of the cured magnetic recording layer. The diamond wheel was brought into contact with the surface of the magnetic recording layer twice.

The video tape was run in a commercially available 8 mm type-tape recorder (FUJIX-8, trade name of Fuji Photo Film Co., Ltd.), and measured on the number of drop-out at 15 μs and -18 dB within one minute and the number of drop-out at 5 μs and -10 dB within one minute.

Independently, the video tape was run in the above-mentioned tape recorder at a normal speed for 90 min., to measure the number of instantaneous clogging.

Further, the obtained video tape was examined on lowering of the reproduction video output. The examination of the lowering was done by repeatedly running the video tape as much as 10 times in the above-mentioned tape recorder and measuring the reproduction video output when the 10 times-repeated running was finished. The measured reproduction video output was expressed by a relative value when the reproduction video output after the first running of the tape was set to 0 dB.

The results on the number of dropout, the number of times of instantaneous clogging taking place on the magnetic head, and the lowering of video output are set forth in Table 1.

EXAMPLE 2

The procedure of Example 1 was repeated except for carrying out the following shaving treatment using a sapphire blade (hereinafter also referred to as "sapphire blade treatment") instead of the diamond wheel treatment, to prepare an 8 mm type video tape.

A sapphire blade (width: 5 mm. length: 35 mm, available from Kyosera Co., Ltd.) having an angle of tip portion (made of sapphire) of 60° was brought into contact with the surface of the magnetic recording layer at contact angle therebetween of 80° while running at a speed of 420 m/min. under tension of 50 g/8 mm applied to the tape, to shave the surface of the magnetic recording layer. The contact of the sapphire blade with the magnetic recording layer was carried out once, using a set of four sapphire blades.

The obtained video tape was examined on the number of drop-out, the number of times of instantaneous clogging, and the lowering of video output according to the above-mentioned tests.

The results are set forth in Table 1.

COMPARISON EXAMPLE 1

The procedure of Example 1 was repeated except for not performing the diamond wheel treatment to prepare an 8 mm type video tape.

The obtained video tape was examined on the number of drop-out, the number of times of instantaneous clogging, and the lowering of video output according to the above-mentioned tests.

The results are set forth in Table 1.

EXAMPLE 3

The procedure of Example 1 was repeated except for using the components for a magnetic paint indicated below (components: the same as those used in Example 1 other than the ferromagnetic powder) and slitting the resulting sheet into a width of ½ inch, to give a VHS type video tape.

| | |
|---|---|
| Co-containing γ-Fe2O3 (Hc: 700 Oe, specific surface area: 40 m²/g, | 100 parts |
| Vinyl chloride/vinyl acetate/maleic anhydride copolymer | 10 parts |
| Polyurethane resin | 8 parts |
| Polyisocyanate compound | 8 parts |
| α-Alumina | 2 parts |
| Stearic acid | 1 part |
| Butyl stearate | 1 part |
| Carbon black | 2 parts |
| Methyl ethyl ketone | 325 parts |

The obtained video tape was examined on the number of drop-out, the number of times of instantaneous clogging, and the lowering of video output according to the above-mentioned tests, using a VHS type video tape recorder (NV-8300, produced by Matsushita Electric Co., Ltd.) instead of the 8 mm type video tape recorder.

The results are set forth in Table 1.

EXAMPLE 4

The procedure of Example 2 was repeated except for using the components for a magnetic paint used in Example 3 and slitting the resulting sheet into a width of ½ inch, to give a VHS type video tape.

The obtained video tape was examined on the number of drop-out, the number of times of instantaneous clogging, and the lowering of video output according to the above-mentioned tests, using the same VHS type video tape recorder as described above.

The results are set forth in Table 1.

COMPARISON EXAMPLE 2

The procedure of Example 1 was repeated except for using the components for a magnetic paint used in Example 3 and slitting the resulting sheet into a width of ½ inch, to give a VHS type video tape.

The obtained video tape was examined on the number of drop-out, the number of times of instantaneous clogging, and the lowering of video output according to the above-mentioned tests by using the same VHS type video tape recorder as described above.

The results are set forth in Table 1.

TABLE 1

| | Drop-out (particles/min.) | | Instantaneous Clogging | Reproduction |
|---|---|---|---|---|
| | 15 μs −18 dB | 5 μs −10 dB | (number of times) | Video Output (dB) |
| Example 1 | 15 | 300 | 0 | 0 |
| Example 2 | 30 | 400 | 1—3 | −3 |
| Com. Ex. 1 | 100 | 2,000 | great number | −6 |
| Example 3 | 35 | 450 | 1—3 | −3 |
| Example 4 | 40 | 500 | 1—3 | −4 |
| Com. Ex. 2 | 150 | 2,000 | great number | −6 |

In Table 1, the expression "great number" means that times of a great number of clogging take place on the magnetic head and that such a clogging as not removable by the running procedure of the magnetic recording medium takes place on the head so as not to measure the number of times of instantaneous clogging.

We claim:

1. A process for the preparation of a magnetic recording tape which comprises the steps of subjecting a magnetic recording layer coated on a non-magnetic support to surface smoothening treatment, said magnetic recording layer comprising a ferromagnetic powder dispersed in a binder which is composed of a resin component and a curing agent, and then shaving the surface of said magnetic recording layer by means of running the tape at a speed of 60–1,200 m/min., while contacting the surface with a sapphire blade at an angle between the rake face of the sapphire blade and the magnetic layer surface of 80°–120°, or while contacting with a diamond wheel having sintered diamond on its outer surface, and having thereon surface grits in the range of #1,200 to #5,000, wherein said diamond wheel rotates in the opposite direction against the running direction of the magnetic recording layer at a rotation speed of 300 to 6,000 rpm.

2. The process as claimed in claim 1, wherein said binder is composed of a resin component containing a vinyl chloride copolymer and a polyurethane resin and a curing agent containing a polyisocyanate compound.

3. The process as claimed in claim 1, wherein said binder is composed of a resin component containing a vinyl chloride copolymer and a polyurethane resin and a curing agent containing a polyisocyanate compound and the ratio between the polyurethane resin and the polyisocyanate compound is in the range of from 1 : 0.8 to 1 : 2, by weight.

4. The process as claimed in claim 1, wherein the step of shaving is performed on a running magnetic recording layer under a tension of 30–100 g/8 mm.

* * * * *